July 30, 1935. J. BIJUR 2,009,428
LUBRICATING INSTALLATION
Original Filed Jan. 18, 1923 3 Sheets-Sheet 1
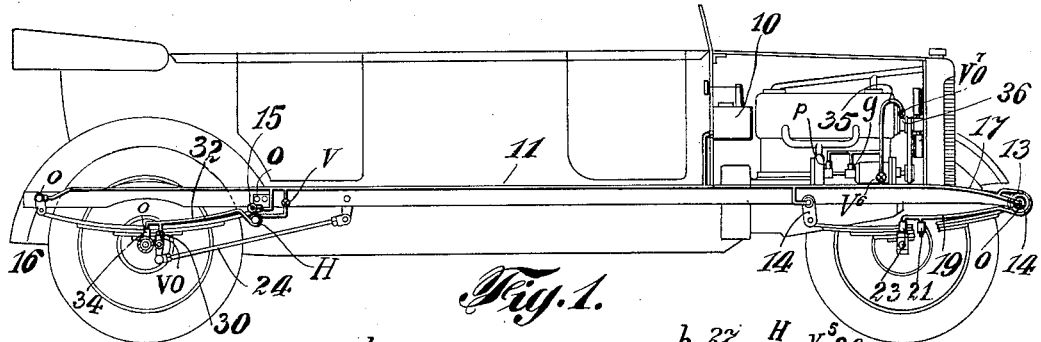
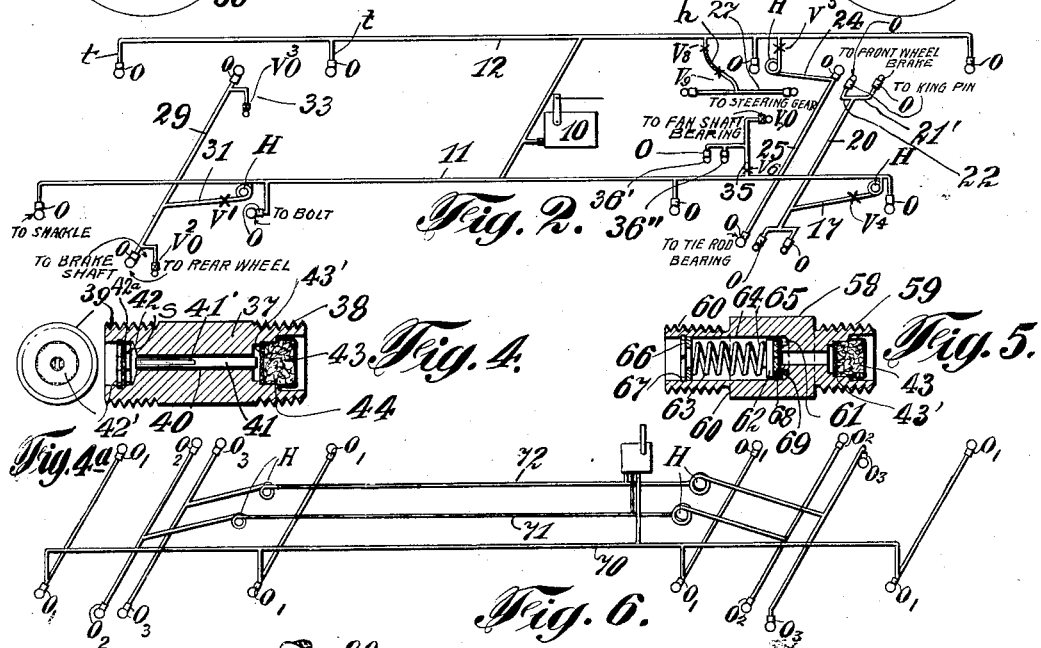
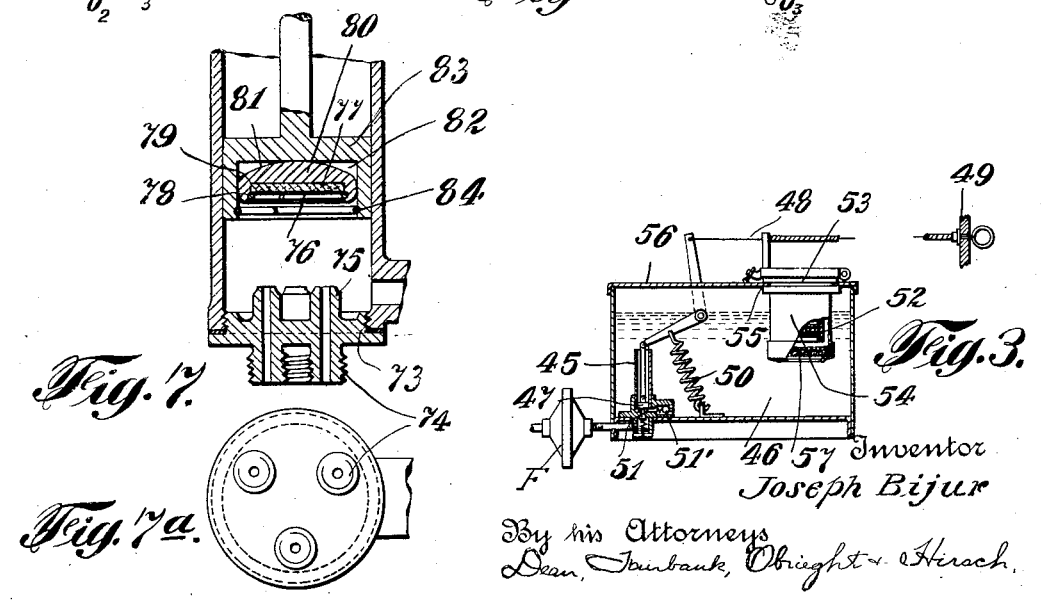
Inventor
Joseph Bijur
By his Attorneys

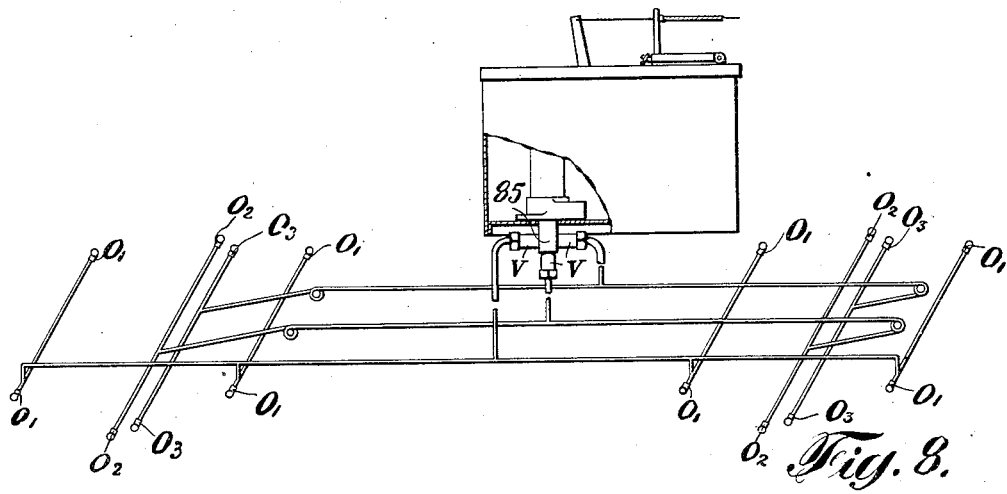
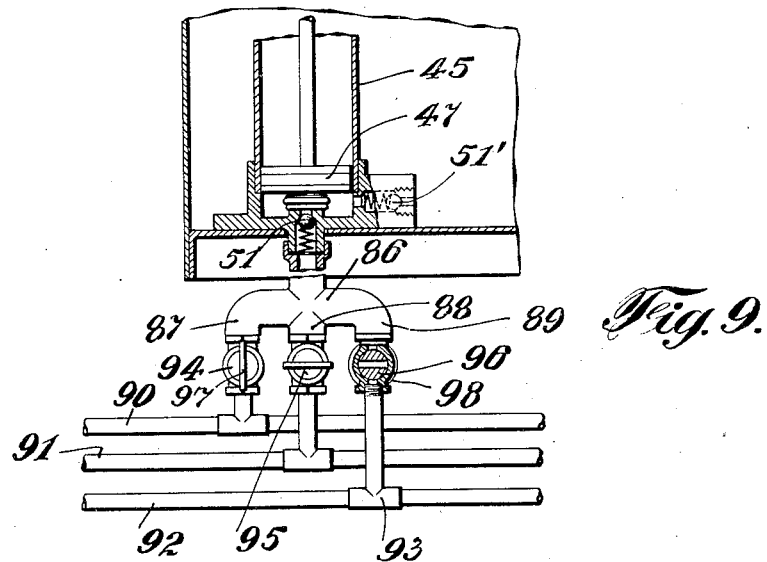

July 30, 1935.  J. BIJUR  2,009,428
LUBRICATING INSTALLATION
Original Filed Jan. 18, 1923   3 Sheets-Sheet 3
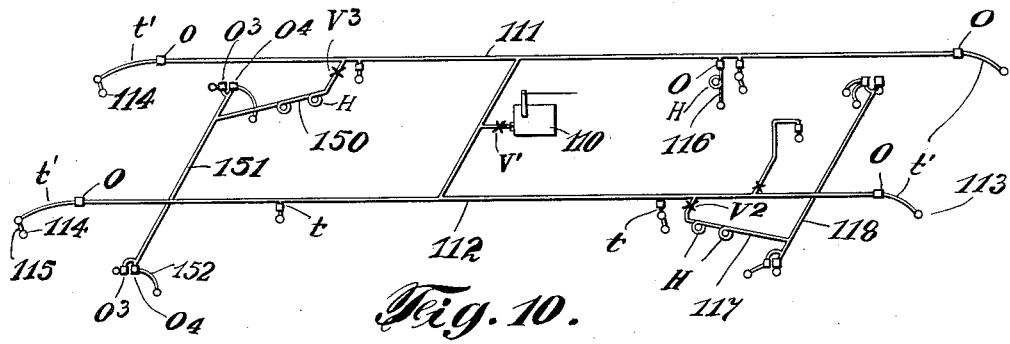
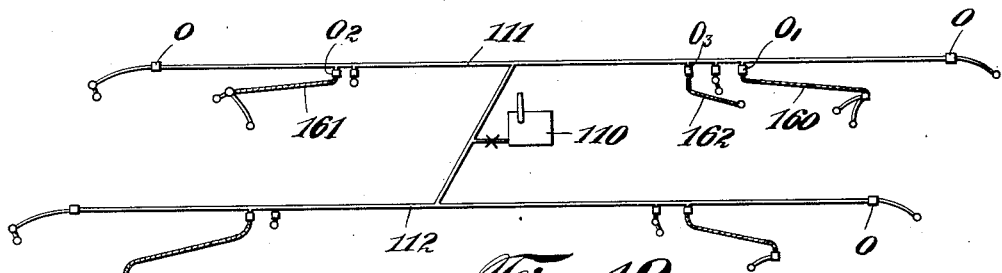
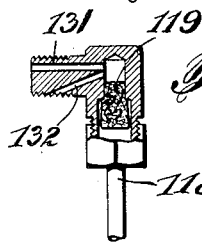
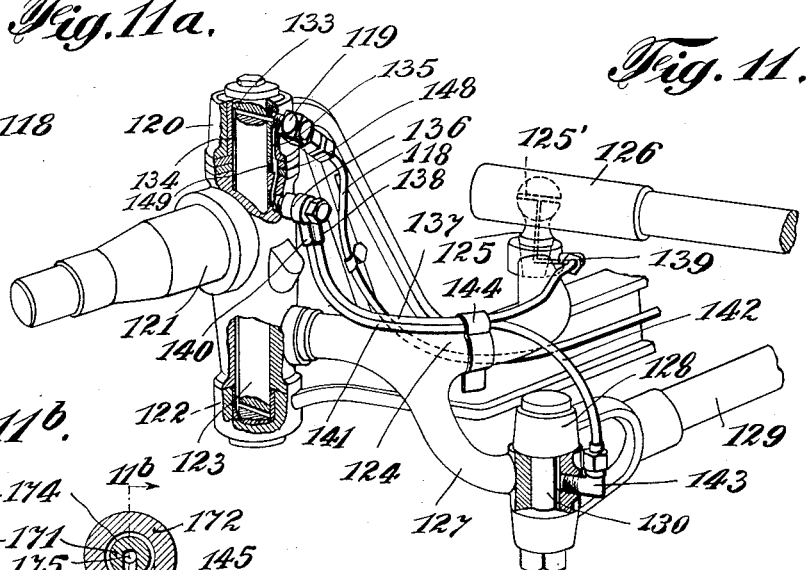
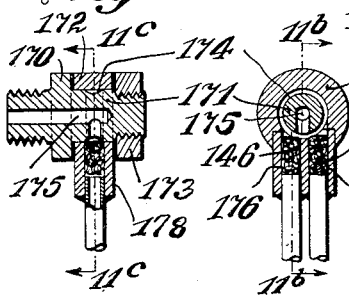
Inventor
Joseph Bijur
By his Attorneys
Dean, Fairbank, Obright + Hirsch Patented July 30, 1935

2,009,428

UNITED STATES PATENT OFFICE 2,009,428

LUBRICATING INSTALLATION

Joseph Bijur, New York, N. Y., assignor, by mesne assignments, to Auto Research Corporation, a corporation of Delaware Application January 18, 1923, Serial No. 613,476
Renewed October 7, 1931

42 Claims. (Cl. 184—7)

My present invention relates to centralized lubricating installations, more particularly to installations for lubricating many or all of the bearings on the chassis of a motor vehicle from a single source of control.

The invention is especially concerned with the type of installation in which the various bearings are to be supplied as required, by oil delivered thereto by pressure from a suitable source, applied to the head of a system of oil-filled conduits communicating with the bearings.

It is an object of the invention to provide an installation of the above type of simple and inexpensive construction, including few valves, yet functioning reliably to prevent undesired drainage or loss from the piping through any one or more of the multiplicity of bearings supplied.

Among other objects of the invention are to provide a system of the type mentioned, the assembly or installation of which shall be particularly expeditious and inexpensive, and which, in operation, shall effect distribution of lubricant to the bearings reliably in accordance with requirements, and without deficiency or excessive overflow at any bearing.

Another object is to provide a lubricating installation, the use of which shall not require the exercise of any selective discretion, but in which, as the result of a simple manipulation, correct and sufficient lubrication is effected at each of the bearings, whether tight or loose and without excessive overflow.

Another object is to provide an installation of the above type which will not be deranged by the entry of dust or dirt and the operation of which, by energy from the hand or foot, will not require much effort.

Another object is to provide an installation which if injured will not be disabled beyond the vicinity of the damage, and in which repair or replacement may be effected without either draining or shutting off the line.

If the system of conduits through which the oil pressure is transmitted has open outlets to the bearings, oil may escape therefrom after an operation, particularly through outlets at a lower level which may drain oil from a portion of the system at a higher level through which air would enter. The entire contents of the full lines after a lubricating operation might, therefore, spill upon the floor or the road, with consequent waste and need for refilling the conduit system. Moreover, any small solid particle carried with the oil is likely to obstruct egress through the outlet, if the line is restricted at any part of the length thereof. Furthermore, in operation, a bearing which has become relatively loose, may receive an excess of the charge of oil, and a tight bearing may be inadequately supplied.

According to one feature of my invention, I eliminate the undesired drainage or leakage, by providing valve means closed, in order to shut off the otherwise open or vented connections between bearings at substantially different levels, and open only while pressure is applied to the line. As the draining can occur only through piping filled to communicating outlets at different levels, but few valves are required, materially less in number than the multiplicity of bearings on an automobile chassis, provided, however, that the pipe line is sufficiently airtight.

I prevent clogging of any of the restricted ducts or outlets with solid particles that may be carried with the oil, preferably by providing the oil reservoir with an appropriate outlet filter, so that only clean oil is admitted therefrom to the piping, and there are, moreover, provided small strainer elements in advance of the outlets, to intercept any dirt or chips picked up by the oil in its travel through the pipe line.

According to another feature of my invention, I plug the otherwise open length of pressure transmitting piping near its outlets, in order to interpose, not merely a restriction, but a high resistance to the flow of lubricant, that is, a resistance of such order as to prevent flow, but to permit only slow, preferably, drop by drop, seepage of the oil under a sustained working or operating pressure. The resistance of the outlets is so high compared to that encountered in the line, that differences in length of line to the various bearings, or in tightness or looseness of the bearings, do not seriously impair the accuracy of distribution.

In view of the consequent relatively slow rate of flow in the line during discharge, it is feasible, and I prefer to use piping of extraordinarily small diameter, preferably of seamless metal tubing, to resist the comparatively high pressures incurred, such piping, moreover, lending itself readily to bending as into a helix to provide fluidtight flexible connections between a line on the frame and a bearing on an axle. Loss of oil from the full piping, after an operation, is prevented by the combined opposition of the outlet plugs at a higher level, which resist the flow of oil therethrough in a direction opposite to normal and the subsequent entry of air, of the outlet plugs at a lower level, which resist the escape of oil, and of the resistance of the small-bore connecting piping to the flow of the viscous oil. Where the difference in level between two communicating sets of outlet plugs of my preferred type is substantial, a draining or syphoning action may occur, which is, however, quite slow and affects only the small volume of oil confined in the small-bore piping. Where such draining is objectionable, simple valves may be disposed in the manner previously referred to, to shut off the vented connections.

The extremely slow rate of oil flow in operation, which is a concomitant of my high resistance outlets, renders inconvenient the use of a hand-discharged pump, as the propelling means because of the length of time for which the manual effort has to be sustained. According to my invention, a pump structure is charged by hand against the resistance of a spring, thus, operating as a pressure generator, the spring exerting automatically a discharging pressure, sustained until the lubrication is completed, that is, until a quantity of oil equal to the charge has been forced past the high resistance outlets.

In one type of installation, separate piping may be connected from the source of pressure to each level of outlets, loss of oil by draining being prevented either by sealing the heads of the independent pipe lines, by the seating of the plunger of said pressure source in discharged position or by effecting such seal beyond the pressure source, by valves preferably spring closed, and opened manually in one embodiment, or in another embodiment by pressure transmitted from the source. The outlets from each of the separate lines of oil-filled piping should be at substantially a common level, and in one layout may all be at the bearings, while in another layout, some of the outlets may be connected with bearings at a different level by connecting leads that are not subjected to pressure in operation.

In an installation in which the piping includes one or two mains extending along the chassis frame and supplied from the source of pressure and the bearings are supplied through branch lines tapped from the mains, spring-seated lubricant pressure opened valves are used to interrupt the vented connections, and these valves may be disposed at any part of the length of those taps leading to bearings substantially lower, or substantially higher than those adjoining the mains.

The above and other features of my invention may be more fully understood from the accompanying drawings, in which are shown various possible embodiments of the several features of the invention.

In the drawings:

Fig. 1 is a side elevation of an automobile chassis, indicating one embodiment of the installation, Fig. 2 shows a desirable piping diagram, Fig. 3 is a view in longitudinal cross-section of a preferred form of pressure source, Fig. 4 is a view in longitudinal cross-section of a restriction outlet fitting, Fig. 4a is an end view thereof, Fig. 5 is a view similar to Fig. 4 of a valve fitting, Fig. 6 is a piping diagram similar to Fig. 2 of a modified form of installation, Fig. 7 is a fragmentary view in longitudinal cross-section of a modified form of pressure source employed in the embodiment of Fig. 6, Fig. 7a is a plan view of the outlet head of Fig. 7, Fig. 8 is a view similar to Fig. 6 illustrating an alternative control means, Fig. 9 is a fragmentary view showing a pump, partly in section, illustrating a further modification, Fig. 10 is a piping diagram of a modification, Fig. 11 is a perspective view illustrating the lubrication of a king pin and the related bearings, Fig. 11a is a detail view in longitudinal section through the multiple restriction duct, Fig. 11b is a view in longitudinal cross-section through the Y fitting, Fig. 11c is a sectional view taken along the line 11c—11c of Fig. 11b, and;

Fig. 12 is a piping diagram of a further modification.

Referring now to the drawings, I have shown in Figs. 1 and 2, the outline of an ordinary automobile chassis, upon which is mounted an oil pressure generator 10, one desirable form of which is shown in Fig. 3 and will be described below. The generator 10 communicates with a pair of mains 11 and 12 extending longitudinally of the vehicle and along the channel frames thereof, said mains being preferably of rigid or solid metal pipe of small bore. Short taps $t$ from each of the mains are connected through fittings indicated at O by symbol □ and shown in detail in Fig. 4, to supply the corresponding front bolt 13 of the front spring, the rear shackle 14 of the front spring, the front bolt 15 of the rear spring and the rear shackle 16 of the rear spring. The bearings below the level of the chassis, that is, those carried on the axles are also supplied through fittings O at the delivery ends of branches, preferably of solid metal piping tapping the mains and having extra length, preferably formed into helices as at H, which afford the necessary flexibility, to permit of the relative movement of the chassis frame and axles, without rupture or strain of the line and without leak or entry of air thereinto. The present invention is not concerned with the precise arrangement of pipe line or the manner of supporting it. By way of illustration, I have shown one branch 17 tapping the main 11 near the front thereof and including a helical conformation H near the front bolt, and extending at 19 along the front spring to the front axle, to communicate with a transverse line 20 extending preferably along the axle and having taps 21' to the front wheel brakes 21 and taps 22 to the king pins 23. The other main 12 is similarly tapped by a branch 24 extending to the tie rod, where it communicates with a transverse line 25, the ends of which supply the tie rod bearings (not shown). A transverse pipe 29 carried by the rear axle is connected to the brake shaft bearings 30 and receives lubricant from main 11 through a solid branch pipe 31 illustratively shown as extending as at 32 along one of the rear springs, and provided with helical conformation H. Tapped from pipe 29 are further pipe sections 33 to supply the rear wheel bearings 34, which are illustratively shown at materially higher level than the brake shaft bearings. I have also shown a riser pipe 35 tapping main 11 and extending upward therefrom to lubricate fan shaft bearing 36, taps 36' and 36'' being provided, if desired, to lubricate the water pump shaft $p$ and the generator shaft $g$ respectively. All of the conduits or piping described, is preferably solid metal pipe of small bore, in the order of $\frac{1}{16}''$ which lends itself readily to bending into the helices set forth. A branch 27 is shown tapping main 12 to lubricate the bearings at the opposite ends of the drag link 27' of the steering gear, although it will be understood that said bearings may be lubricated through independent branches. Outlet fittings are indicated at O by symbol □ at each of the bearings described and shown diagrammatically in Fig. 2.

The outlet fittings O are of identical construction, shown in detail in Fig. 4. In the preferred embodiment, the unit comprises a pipe fitting element 37 threaded at one end 38 for connection to the conduit and at the other end 39 for attachment either to the bearing, in the manner of an oil cup or in the run of the line. Within the bore 40 of the fitting is a rod or pin 41 which is of substantially the same cross-sectional area as said bore to substantially fill the same, the difference in diameter being in the order of .001 of one inch. A spring washer 42 is snapped into an appropriate groove in the outlet end of the fitting to prevent escape of the pin therefrom. Preferably washer 42' is pressed against a conical seat s in the fitting and affords but minute outlets at its scalloped periphery for a purpose appearing below. A plug 43 of material, such as felt, is snugly fitted into a corresponding socket 44 at the inlet end of the fitting, exposing to the flow of oil from the line, both its end and a portion of its lateral surface, for the purpose of intercepting any minute particles or chips taken up in the line, thereby preventing eventual clogging of the minute crevice between the bore of the fitting and the pin therein. Preferably a backing 43' of metal gauze is disposed at the inner end of the felt plug to prevent movement toward the restriction pin 41, of any hair that may separate from the felt. The minute cross-section of the restriction being the difference between that of the bore and that of the pin, it can be easily made within close limits of accuracy, to assure reliable functioning, and by reason of the substantial length of said crevice, transversely of the pipe bore, it is unlikely to become clogged. If desired, a disk of felt 42ᵃ may be provided at the outlets of fittings O, preferably interposed between washers 42 and 42' to prevent the entry of dirt thereto from the bearings.

The outlet fittings have resistance of such order that when a pressure as high as fifty pounds per square inch is applied at the pressure source 10, the lubricant will escape through the outlets by seepage and not by flow, that is, at a rate in the order of only from about one to thirty drops a minute, depending on viscosity. With such arrangement, the operation is too slow for convenient discharge by hand or foot operation. For this reason, it is accordingly preferred to provide the device shown in Fig. 3, which includes a cylinder 45, submerged in reservoir 46 and charged by hand elevation of piston 47, as through a wire 48 accessible at the instrument board 49, and against the resistance of a spring 50 and subsequently discharged by the slow return of the deformed spring which will, therefore, exert a substantial and sustained pressure, which will endure until a volume of lubricant equal to that in the cylinder, will have passed beyond the restriction outlets O to the various bearings. I accordingly call the device shown in Fig. 3, an oil pressure generator. Check valve 51' prevents discharge of the generator into the reservoir and relief valve 51 at the bottom of the cylinder maintains the head of the pipe system closed after the piston reaches discharged position.

The reservoir 46 is provided with a removable strainer cup 52 at its filling opening 53, below which is a filter cup 54 soldered as at 55 into cover 56 of the reservoir, and provided with a bottom 57 of filter material, such as felt, to intercept solid particles in the oil, so that the advance strainers 43 at the outlet fittings will not be prematurely clogged, said strainers intercepting merely such particles or chips as are picked up in the line. It is preferred, moreover, to provide an appropriate filter indicated diagrammatically at F through which the lubricant is forced, as the generator discharges, for fresh filtration of the lubricant entering the pipe line.

In the system described, even if the piston plunger be firmly seated to prevent entry of air at the generator end of the line, leakage may occur from the full lines by a draining and siphoning action, the lubricant slowly escaping through outlet fittings O at a lower level, as for instance, at the tie rod bearings, and being drawn by suction away from outlet fittings at higher level, as for instance, at the spring bolts and shackles. The outlet end of each fitting O is covered with oil confined between washer 42 and the restriction pin 41 and held by capillary action at the small clearance between the scalloped edge of said washer and the cone seat s, so that an oil seal is provided. No air can enter through an upper fitting until the oil back of disk 42' has been sucked through the restriction duct, which operation proceeds quite slowly because of the high resistance of the minute restriction duct. It is preferred as shown in Fig. 4a to flatten the end of the restriction pin adjacent the oil seal as at 41' to assure the presence of an appreciable quantity of oil at the exit of the main restriction, regardless at what inclination the fitting be applied at the vehicle.

Where the difference in level is merely in the order of a few inches, as for instance, that between the hinge bearing and the shackle of a front spring, there is ordinarily no serious drainage action with the use of the outlet fittings described, the difference in head being insufficient to overcome the high resistance to oil flow at the lower of the fittings, and to reverse flow of oil at the higher of the fittings. Moreover, the small-diameter connecting pipe offers substantial resistance to the flow of the relatively viscous oil therethrough. Where, however, the difference in level is of higher order, in the neighborhood of a foot or more, as for instance, that between the spring bolts and the tie rod bearings, then the gravity head of the lubricant in the pipe may be sufficient to cause slow leakage of lubricant through the high resistance outlet fittings at lower level, air entering through the fittings at the higher level, after the oil beyond said fitting has been sucked therethrough. With the small low-volume piping, only a small quantity of oil would be lost by such leakage. According to my invention, I eliminate such loss with the use of a minimum of simple parts. Broadly, I achieve this object by disposing valves in the system which are normally closed to establish an air-tight seal between each group of communicating bearings which are at sufficient difference of level to permit the draining action noted.

Referring to Figs. 1 and 2 of the drawings, it will be noted that I have provided such valves at V' to V⁹ inclusive, all of the pressure-operated type, shown in detail in Fig. 5, and indicated in the various diagrams by symbol X. The valve V' is located near the head of the branch 31 leading to the rear axle bearings. I have shown it located, by way of example, between the bearings and the helical conformation H. This valve normally interrupts the connection between the various open outlets O on the chassis frame and the bearings associated with the rear axle, thus, effectively, preventing draining. In the present embodiment, if the difference of level between the brake shaft bearings and the rear wheel bearings, as indicated in the drawings, is sufficient to render possible the draining of lubricant from the brake shaft bearing line through the lower rear wheel bearing line, I may provide, as for instance, at $V^2$ and $V^3$, valve fittings adjacent the rear wheel bearings, to prevent such draining. The valves $V^2$ and $V^3$ may be located at any part of the length of taps 33, to the lower bearings, and may, if desired, be formed in unitary fittings with the outlet fittings, as indicated at VO. The valves $V^2$ and $V^3$ may be located near the upper or brake shaft bearings, if desired, instead of at the lower bearings.

At the front end of the vehicle, I have shown a valve $V^4$ in branch 17 and valve $V^5$ in branch 24. The valve may be at any part of the length of the branch, and by way of illustration I have shown valve $V^5$ in advance of the flexible helix H and valve $V^4$ between the flexible helix H and the bearings to be supplied therefrom. A valve $V^6$ is disposed in the branch 35 to the fan bearing, preferably adjacent the main, and a similar valve $V^7$ at the outlet to the fan shaft. By the construction described, it will be seen that although the line is open, without closure valves, at the various chassis frame bearings, the front wheel brake bearings, the brake shaft bearings and the tie rod bearings, yet no lubricant is likely to escape from the line to overflow the bearings, since the line to each of these bearings is otherwise effectively closed to prevent the entry of air required to permit the escape of lubricant.

The flexible branch 27 to the drag link is shown of modified form in Fig. 2, including a flexible section $h$ of suitable hose in lieu of the solid pipe flexible helices H shown in the other flexible branches. The flexible hose section $h$ should, of course, be sufficiently tight to transmit pressure from the pressure generator. Since such hose may not be fluid-tight, some of the pipe contents may gradually leak through the wall thereof, with entry of air. Preferably I provide valves $V^8$ and $V^9$ of the type shown in Fig. 5, normally closed to isolate the flexible section $h$ with respect to the rest of the system, so that only the contents of said short flexible section $h$ may escape, valve $V^8$ preventing entry of lubricant thereto from thereabove, and valve $V^9$, the application of atmospheric pressure therefrom to the section therebelow. Although, I prefer to employ the solid helices H in all of the flexible branches, the flexible hose section $h$ may be employed to advantage both in the specific relation shown, and in lieu of the solid helix in some or all of the flexible branches.

The preferred embodiment of valve V shown in Fig. 5, comprises a pipe fitting 58 having threaded ends 59 and 60, which may be secured between sections of the pipe line in any appropriate manner. The fitting is provided with an integral annular valve seat 61, preferably highly burnished, and a disk valve 62 is urged to closing position against said seat by a coil spring 63, within the bore 64 of the fitting and encircling knob 65 on the valve, said coil spring being maintained in place by a washer 66 in turn held by a split ring 67. The valve is preferably formed of metal and has a seating portion 68 which may be of soft leather faced with oil paper 69 or the like. The valve fitting is also provided with a felt strainer 43 similar to that shown in the fitting of Fig. 4, to prevent the passage of chips from the line to the valve seat which might interfere with seating.

It will be seen that, in general, all of the high resistance outlets, substantially at one common level, may be kept clean without associated valves, provided only that, the system is not vented, either at a substantially higher or at a substantially lower level. Shutting off the vented connections to the higher levels prevents escape of lubricant through the outlets at the said common level. Shutting off the vented connections to the lower level prevents drainage of lubricant through the latter, from piping adjacent the outlets at the said common level. The piston 47 and check valve 51 prevent entry of air to the system at the pressure source.

As indicated in the diagrammatic view, Fig. 2, in which the greatest number of bearings at any substantially uniform level are on the chassis frame, it is those lines which are preferably left open except for the restricted outlets, valves being provided merely in the lines leading therefrom to those bearings at a higher level and to those at a lower level. By this arrangement, the likelihood of undesired escape of oil from the full lines due to a defective valve is, moreover, minimized. Obviously, the general system of piping layout described may be applied to substantially any chassis construction, and regardless of the number of bearings to be lubricated.

In the embodiment of Fig. 6, I have shown an alternative arrangement of piping in which the entire length of all of the pipe lines is open, each of the bearings being supplied through a fitting O of the type shown in Fig. 4, presenting a high resistance open outlet. According to the present embodiment, the outlets on the chassis frame indicated at $O_1$, which are substantially at one uniform level, are supplied from one line of piping 70 directly connected to the pressure generator. The outlets to the front wheel brakes, to the rear wheel brakes and to the king pins indicated at $O_2$ and which are substantially at a uniform level below that of the chassis frame, are supplied from a second line of piping 71, independent of the first line and directly supplied from the generator. The outlets to the rear wheel bearings, the steering gear and the tie rod bearings indicated at $O_3$ which are also substantially at a uniform level below those of the two groups of bearings referred to, are supplied through a third independent line of piping 72 communicating directly with the generator. Each of the lines of piping includes a longitudinal element, and lateral branches, the latter connected to the bearings. The conduits are preferably of solid metal pipe, as in the embodiment of Fig. 2, to prevent leakage or entry of air. The flexibility requisite for bridging over from the chassis frame to which the main length of the pipe is preferably anchored, to the axles is preferably through the helical conformations, indicated diagrammatically at H in Fig. 6, substantially as in the embodiment previously described.

According to one embodiment of the invention, the pressure generator piston serves to close the intake ends of the line with an oil-tight seal, when in discharged position. A fragment of a preferred embodiment of generator for this purpose is shown in Fig. 7. The cylinder is preferably within a reservoir similar to that of Fig. 3, equipped with appropriate filter means. The cylinder is provided with a delivery head 73 threaded into the base thereof, said delivery head having in the embodiment illustrated, three outlet nipples 74, one for connection to each of the independent lines of piping, indicated in Fig. 6. The nipples are provided with integral valve seats 75 within the generator cylinder, to be sealed by the piston at the discharge end of its stroke. To compensate for any irregularities in the construction of the piston or of the seating annuli, the piston is formed with a self-adjusting bottom, constituting a valve for sealing the heads of the lines. The piston for this purpose includes an oil-proof facing 76 and a yielding leather backing 77, firmly held by split ring 78 in a corresponding depression 79 within a metallic holder 80 formed with a rounded base 81, for rocking adjustment within a cylindrical cavity 82 in the piston 83, said holder being maintained by split ring 84 from dropping out of the piston. It will be seen that when the piston reaches the end of its discharge, the valve holder will readily rock to adjust itself through the small range requisite for seating firmly on the three seats, the yielding material of the seating element effecting a firm oil-tight seal.

In Fig. 8 is shown a further modification employing a system of piping, which may be identical, as shown, with that shown in Fig. 6 and utilizing the simpler pressure generator piston construction of Fig. 3. In the embodiment shown, the outlet from the pump is provided with a cross-fitting 85 to which I attach independent pressure-opened valves V of the type shown in Fig. 5, the cross-fitting being supplied from the pump and the three branches thereof respectively supplying the three independent lines of the system. If desired, a filter similar to that at F in Fig. 3 may be disposed near the outlet of the pressure generator. It is, of course, understood that the systems shown in Figs. 6 and 8 may be carried forward to supply bearings at four or more different levels.

In order to operate the systems described, the wire 48 is simply pulled, thereby elevating the generator piston against the resistance of spring 50 and drawing in, past check valve 51', a charge of the oil in the reservoir, which has been previously filtered by the strainer and filter cups 52 and 54. The resistance of the various outlets O is high, compared to that of the length of the line or of the various pressure-operated valves V in the layouts of Figs. 1, 2, 6 and 8, so that a substantially uniform pressure is transmitted from the generator to each of the various outlets and the lubricant oozes or seeps therefrom at a uniform rate, substantially unaffected by the length of piping between the generator and the outlet, or the tightness or looseness of the bearings supplied. The bearings are thus slowly lubricated, as a consequence of the contractile force of spring 50 until the piston has slowly settled to the discharge end of its stroke, closing the head of the piping, whereupon the pressure on the line ceases and the various valves V close automatically. It will be seen that during the discharge, the oil is forced past the outlets by the diminution of generator cylinder contents, and no air can enter the system. By the closure of the pressure-operated valves in Figs. 1, 2 and 8, following the seating of the piston, the various vented connections between outlets at substantially different levels are interrupted, so that no draining action will take place, and the various pipe lines remain filled up to the restricted outlets. The entry of air into the line being thus substantially precluded, no escape of oil will occur, except while the pressure is applied from the generator. In the system of Figs. 6 and 7, it is the pump piston which closes the upper end of the line to prevent loss by drainage through the outlets.

It will be noted that since the pipe line is of solid metal, no air will enter even at the flexible helical portion used, where the lines bridge from the chassis frame to an axle therebelow. Although it is preferred to employ solid metal airtight lines throughout the system, it is seen that drainage loss will be prevented if the line is airtight only for the length between each valve and the outlet or outlets supplied therefrom, for instance, as shown at the hose section in branch 27, Fig. 2. Such flexible nonfluid-tight hose will refill relatively rapidly when the pressure of the generator 10 is applied, the pressure thereupon being transmitted to the outlets in the manner previously described.

If an outlet fitting and the contiguous piping should be injured as by collision, substitution or replacement may be effected with facility, without need for previously emptying the lubricant from the uninjured part of the system, the line remaining filled, as is apparent from the foregoing, during the interval between the removal of a fitting or a length of piping and the application of another.

In Fig. 9 is shown a further modification which may include a piping layout of the type shown in Figs. 6 or 8 including the restricted outlet fittings O at the bearings (not shown) the piping being shown broken away in Fig. 9. The pump may be of the same type as that shown in Fig. 3, Fig. 9 showing a fragment of the pump on a larger scale, corresponding parts bearing the same reference characters as in Fig. 3. In the present embodiment, the pump discharges through a fitting 86 having three outlets 87, 88 and 89 communicating respectively with the pipe lines 90, 91 and 92, preferably through T fittings 93. Between the T-fitting and the corresponding branches of the pipe fitting 86, and preferably accessible at the instrument board, are hand-operated substantially conventional stop cock valves 94, 95 and 96, provided with operating handles 97 and normally held closed by springs 98, as best shown in the sectional view of cock 96. These valves are preferably of rugged and tight construction unlikely to develop leaks or to become clogged with dirt.

In operation of the system shown in Fig. 9, the pressure generator is first charged in the manner already described, the spring 50 storing energy until released, following the opening of one or more of the valves. When any or all of the stop cock valves 94, 95 and 96 are manually opened, either successively or concurrently, the pump piston is released to move toward discharged position under the pressure exerted by the spring 50, thereby effecting lubrication of the bearings on the lines that are held open. The valves all being normally closed, shut off the separate systems of piping from communication either with the pipe fitting 86 or the generator, so that loss of oil by drainage through the open outlets leading to the bearings is substantially precluded. If desired, means may be provided, interlocking the handles of the various stop cocks, so that they may be opened by a single operation.

The generator may be charged at any time, even when no lubrication is desired, as for instance, when the vehicle is in the garage, and lubricant will pass therefrom to the bearings when one or more stop cock valves are opened. With the generator thus charged, lubrication is effected by merely opening a stop cock valve and holding it open for the desired period during which the pressure generator forces oil through the line to the bearings.

Preferably the stop cocks are opened only one at a time. Fewer outlets being thus supplied from the generator at any instant, reliability of distribution to the bearings can be effected with coarser restrictions at the outlets, such coarser restrictions allowing the passage, without clogging of relatively dirty oil therethrough to the bearings, particularly since the rugged hand-operated cocks are self-cleaning and will automatically work out any dirt or dust that may tend to collect thereat. This system, moreover, provides selective lubrication in that the bearings controlled by any cock may be lubricated at will, without supplying the remaining groups of bearings. Moreover, the possibility of the hand-operated cocks jamming or sticking in operation is substantially precluded.

In the embodiment of Fig. 10, I have shown three lines, a chassis frame line, a front axle line and a rear axle line, which are shut off by valves from communication with each other, except when pressure is applied at the source. Each line is open from end to end and has ducts therein restricted to offer a resistance to flow, which is high relative to that in the length of the line, thereby effecting reliable distribution. The restriction ducts on each line are at a common level, to prevent drainage or siphoning of oil. Some of the restriction ducts are disposed as terminal or outlet fittings on the bearings at highest level on any line, and the remaining restriction ducts on the line are connected by corresponding conduits open for gravity feed to the lower bearings.

The specific installation of Fig. 10 comprises a pressure generator 110 preferably of the same type as that shown in Fig. 3 connected to mains 111 and 112 extending lengthwise of the vehicle frame. The chassis frame is illustratively shown curved downward at the front and rear, so that the front bolts 113 for the front springs and the rear shackles 114 for the rear springs are at a level lower than that of the main. Each of the spring bolts and shackles is supplied through a restricted duct element O of the same type as that shown in Fig. 4, said duct elements all at substantially a common level, that of the length of the main. Short taps t to the various bearings, serve as gravity flow leads for the lubricant forced past the restriction ducts, the drooping ends t' of the mains, conveying lubricant by gravity flow to the bearings at their ends, after it has been forced through the corresponding restriction ducts O at the uniform level of the main. The spring shackles are preferably provided with appropriate conduits 115 through which lubricant passes by gravity from the upper to the lower bearing thereof, both bearings of each shackle being supplied from a single corresponding restriction fitting. The detailed mechanical construction and connection of the shackle, need not here be described, as it is no part of the present invention.

In the present embodiment, also a flexible conduit 116 is tapped from the main to supply the rear bearing on the drag link of the steering gear, a restriction fitting O being also provided near the head of said conduit and at substantially the same level as the other ducts O on the main to control the flow through conduit 116.

A valve V' normally closes the head of the line from the pressure generator and from atmosphere, so that the line will remain filled up to all of the equilevel chassis frame restriction ducts. The various branches or taps t, t' beyond the restriction ducts which serve to connect the latter with the bearings, are normally empty or drained.

In the present embodiment, a flexible conduit 117 is provided, tapping the main 112 and leading to the front axle. This line is preferably of solid metal seamless air-tight or fluid-tight piping provided with one or more appropriate helical conformations H to permit of the relative movement of axle and frame. The branch 117 includes a transverse element 118, also of solid pipe upon the front axle, from which the various bearings at opposite ends of the axle are supplied. A valve V² of the type shown in Fig. 5 is provided at the head of branch 117 to interrupt the otherwise open or vented connection between the open restriction ducts O at the chassis frame level and the outlets therebelow at the front axle. A preferred embodiment of the distributing means for supplying the bearings at the left end of the front axle, is shown only diagrammatically in Fig. 10, the structure being illustrated in perspective in Fig. 11.

Referring to Fig 11, the branch line 118 is connected through a fitting 119 to be described below, in the upper clevice arm 120 of the front axle. The wheel control apparatus is shown of conventional construction, including a steering knuckle 121 fitting between arms 120 and 122 of the axle clevice and connected thereto by king pin 123 which in the present embodiment is shown of the rotatable type to move as a unit with the steering knuckle. Rigid with the steering knuckle 121 is shown the curved steering arm 124 provided with the ball stud 125, coacting with the usual socket in the drag link 126. As an integral branch of the steering arm, there is a further arm 127 having its end connected to the clevice 128 of the tie rod 129 by means of a bolt 130.

The fitting 119 shown in section in Fig. 11a is of a type generally similar to that shown in Fig. 4, except that it is provided with two restriction pin ducts 131 and 132, through the former of which the bearings of the associated king pin are supplied, the other supplying the drag link and tie rod bearings. Restriction duct 131 communicates directly with the upper bearing 133 of the king pin, overflowing through a vertical passage 134, at the side of the king pin, to supply the lower bearing 122 thereof. The second restriction duct 132 communicates with a vertical passage 135 through the upper clevice arm 120 of the axle and the steering knuckle 121, and empties at a branch or Y-fitting 136 (Figs 11b and 11c). The Y-fitting includes an outlet plug 170 threaded into the steering knuckle and provided with an integral axial stud 171 about which is telescoped collar 172, held firmly in position thereon by nut 173. The collar has an inner peripheral groove 174 communicating with the bore 175 of the outlet plug, said peripheral groove communicating with lateral outlets or branches 176 and 177 in an integral lug 178 on collar 172.

A conduit 137 is connected as by soldering to the outlet of branch 177 of the Y-fitting and extends down to the steering arm 124 and along said arm and is connected by an appropriate unrestricted outlet fitting 139 to the ball bearing element 125. To the second branch 176 of the Y-fitting is similarly connected a conduit 141 similar to that described, which extends parallel thereto, along the arm 124 and bridges over as shown at 142 to supply the tie rod clevice pin 130 through an unrestricted outlet fitting 143 at the end thereof. In the present embodiment, it will be seen, that fittings 136, 139 and 143 move as a rigid unit with the steering knuckle, so that the connecting pipes 137 and 141 may be and preferably are of solid rigid metal pipe. A single appropriate clip 144 serves for attachment of both conduits 137 and 141 to arm 124. To assure division of the lubricant in desired proportions to conduits 137 and 141, the branch or Y-fitting 136 may be provided with wicks 145 and 146 in the branches thereof and resting upon the upper ends of the conduits.

In operation, lubricant forced by pressure past the second restriction duct 132 in fitting 119, drops by gravity through passage 135 and is divided at the wicks 145 and 146 in the Y-fitting, part dripping into conduit 141 and draining to bearing 130, the rest dripping into conduit 137 which delivers through fitting 139 to and through ball 125, the latter being at a level several inches lower than the wick. It is understood that the length of the conduit 137 will normally be filled with lubricant up to substantially the level of the ball duct 125', so that upon entry of lubricant through wick 145, the level at the opposite end of the line will rise to admit a corresponding quantity of oil to the bearing. The oil normally remaining in conduit 137 will not leak therefrom, since said conduit, as previously noted, is of rigid pipe.

As the pressure from the source is substantially absorbed in the restriction fitting 119, oil passes by gravity flow through passages 134 and 135, from the bearing 129, to the relatively movable steering knuckle. The thrust bearing 148 between axle and steering knuckle being maintained relatively tight by the weight of the vehicle body supported thereon and the oil which passes thereacross to the bearings not being under pressure, leakage is substantially precluded. As shown, passage 135 is preferably spaced from the king pin, the communicating aperture 149 in the thrust washer being of sufficient length to maintain continuity of said passage in all positions of the steering knuckle. Only a small film of the oil can escape laterally at the thrust washer and serves to lubricate the thrust bearing. Thus, the oil is delivered from the axle to the relatively movable bearings on the steering knuckle, by passing across the particularly rugged thrust bearings of the vehicle, thereby eliminating the need for projecting oil swivels or extra length of flexible conduits, which unless adequately protected, are subject to injury from the impact which the front of the vehicle frequently encounters.

Of course, it will be understood that for lubricating the bearings at the right side of the front axle, the construction described would be used, simplified by the omission of conduit 137, the restriction duct 132 supplying only the tie rod clevice pin bearing.

Instead of the single multiple fitting 119 with two restriction ducts, it is, of course, understood that separate and distinct fittings may be used, and it is, moreover, apparent that, if desired, the drag link and the tie rod bearings may each be supplied through a separate and distinct restriction duct, as may the upper and the lower king pin bearings.

It is manifest that the invention illustrated in Fig. 11 is applicable to a stationary instead of the rotary king pin construction shown, and also to a construction of tie rod pin rigid with the steering knuckle instead of with the tie rod.

If desired, a valve of the type shown in Fig. 5 may be provided at the multiple restriction fitting 119, and may be embodied in a unitary construction therewith.

As best indicated in the drawings in Fig. 10, the outlet ends of the restriction pin ducts 131 and 132 at the front axle, which are disposed two at each king pin, are all at a common level. The valve $V^2$ preventing the entry of air to the pipe line 117 from above said ducts, and said branch pipe being air-tight, from said valve to the ducts, it follows that said branches will normally be maintained filled with lubricant without likelihood of any leak, drainage or syphoning therefrom, even though no valves are provided at or below the restriction ducts.

A single pipe line 150 generally similar to that at the front axle, provided with similar helical conformations H and normally closed at its upper end with respect to the chassis frame main by a valve $V^3$ which may be of the type shown in Fig. 5, supplies the rear axle through transverse pipe 151. Pipe 151 delivers oil through an arrangement of restriction ducts O at a common level, indicated diagrammatically in Fig. 10. Illustratively, four restrictions are shown, two at each side, two of said restrictions $O^3$ constituting terminals applied at the rear wheel bearings, the other two restrictions $O^4$ emptying by gravity through corresponding conduits 152 to supply the rear brakes.

In the installation shown in Fig. 10, where the restriction ducts on each of the lines are at a common level, and each line is closed thereabove against entry of air, no escape of oil will occur, except while the pressure generator is functioning to effect slow seepage past the restriction ducts, all of the lines remaining filled from the source up to said ducts, and delivering to those conduits connecting restriction ducts to bearings. If the application of working pressure to the system resulted in a continuous stream of sufficient volume to fill the normally empty conduits to the lower bearings, instead of in the slow drip set forth, it is apparent that after shutting off the source of pressure, such filled conduit might drain oil from a portion of the line as by a syphoning action, air entering near a bearing or bearings at higher level.

Obviously, the pressure generator and associated valve arrangement shown in Figs. 7, 8 or 9 may be substituted for that diagrammatically shown in Fig. 10.

In Fig. 12, I have shown a diagrammatic view of another embodiment of the invention, in which all of the restriction ducts governing the distribution of the charge from the pressure generator are at substantially one common level, the lines being normally empty below said level. This view indicates a pressure generator 110 normally closed as by valve X from pipe mains 111 and 112, identical with those in Fig. 10. As indicated, the restriction ducts O to the various shackle links and spring bolts are at a common level, as in Fig. 10. Main 111 supplies all of the bearings at the left side of the vehicle and main 112 all of the bearings at the right side. A flexible conduit 160 at the left main has a restriction duct O', at substantially the same level as ducts O, and leads to the left king pin. The division of lubricant to the king pin and related bearings is effected through means similar to that shown in Fig. 11, except that instead of the restrictions in fitting 119, wicks (not shown) may be used to divide the lubricant which flows thereto by gravity from restriction duct O'. A similar flexible line 161 supplies the bearings at the left side of the rear axle, division there also being effected by wicks (not shown), said line also having a restriction duct $O^2$ at its head, at substantially the same level as the remaining ducts. A similar flexible connection 162 is effected through a restricted duct $O^3$, at the same common level, with the rear end of the steering gear. The arrangement at the right side of the vehicle is identical with that at the left, except, of course, that no steering gear lubrication is provided.

In operation, the discharge of the pressure generator will cause lubricant to be forced past the various restriction ducts at the common level and to drain by gravity through the various taps and flexible branches and to supply the corresponding bearings. When the system is not operating, the valve closes the system against entry of air from above, and the various restriction ducts being at one common level, no drainage or escape can take place from the mains. The taps and flexible lines below the outlets in this embodiment being normally empty, may, if desired, be made of hose which need not be airtight or pressure-tight. Thus, in the present embodiment, the various bearings on the chassis frame and below the chassis frame are reliably lubricated, without the use of any valves, other than the single valve controlling the exit from the pressure generator.

It will be understood that while the various layouts of piping set forth have been shown illustratively applied to the bearings of a vehicle of one type of construction, the bearings on any automobile chassis may be lubricated through piping connected in the general manner disclosed. In the use of a piping layout of the general type shown in Figs. 6 and 8, the selection of bearings on each of the separate lines and the number of such lines will depend in each case, on the relative position of such bearings. It is to be noted that all the bearings at any substantially common level need not necessarily be supplied from a common system of piping, there being wide freedom of choice in the arrangement of conduits and restriction ducts with respect to any vehicle.

The invention is not limited in its application to automobile chassis lubrication, but many of the features thereof, may be applied to the lubrication of substantially any machine or system of machines.

I claim:—

1. In a lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, bearings, piping, a portion of which is at level higher than said bearings, means for applying pressure to lubricant in said piping, connections leading from the piping to the bearings, and having outlet ducts at said bearings affording continuously open communication therebetween, and a pressure responsive air excluding device remote from the outlets to check the escape of lubricant from the connections, while maintaining them filled; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

2. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure source, bearings at different levels, piping supplied from said source and having branches with outlet ducts effecting highly restricted, but open connection to the corresponding bearings from the piping, and valves in the path of flow from the outlets at higher level to those at lower level closed when the source is not discharging to prevent flow by drainage through outlets at a lower level; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

3. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure source, bearings at different levels, a system of piping supplied from said source and including highly restricted ducts, corresponding one to each bearing and controlling the flow thereto, and valves less in number than said bearings, and normally closed to interrupt the vented connections between bearings at substantially different levels, in order to prevent draining from upper piping to lower bearings; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

4. In a centralized lubricating installation, for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including in combination, a pressure source, bearings at different levels, a system of piping supplied from said source and including highly restricted ducts, corresponding one to each bearing and controlling the flow thereto, and valves less in number than said bearings, and normally closed to interrupt the vented connections between bearings at substantially different levels, in order to prevent draining from upper piping to lower bearings, said highly restricted ducts being formed in special fittings applied at the bearings, and said fittings including filter means in advance of said ducts.

5. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure source, bearings, a system of piping supplied from said source and including branches with outlet ducts effecting connection to the corresponding bearings from the corresponding length of piping open both when the source is discharging and when it is idle, and valves effective while the source is not discharging to close said piping between otherwise communicating outlets located at substantially different levels, whereby the piping is maintained full of lubricant between outlets in the intervals between operations of the pressure source; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

6. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pump structure, means for applying thereto a sustained discharging pressure, bearings at substantially a common level, bearings at another substantially common level, piping connected to said pump structure, highly restricted open outlet ducts to a plurality of said bearings to prevent flow but permit seepage therethrough, and means effective while the pump structure is not discharging to interrupt flow between the bearings at one level and the bearings at the other level; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

7. In a chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure source on the frame, piping supplied from said source and including branches communicating with bearings on the frame, branches communicating with bearings on the axles, said branches including restricted outlet ducts and said latter branches having flexible sections and being airtight between said sections and the bearings, and valves less in number than said bearings and in the length of piping connected between bearings at different level, said valves normally seated to shut off the otherwise vented connections in said connecting piping; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

8. In a chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, bearings upon the frame, bearings upon the axles, a conduit main supplied from said source, branches tapping said main to supply said frame bearings, flexible branches to the bearings on the axles, each of said branches having a highly restricted duct, and oil pressure operated valves in said flexible branches normally closed to prevent loss of oil through the lower ducts by draining from the piping at the upper ducts; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

9. In a chassis lubricating installation, in combination, a source of oil pressure, bearings upon the frame, bearings upon the axles, a conduit main supplied from said source, branches tapping said main to supply said frame bearings, branches to the bearings on the axles, each of said branches having a highly restricted duct, the branches to the axles including flexible sections, and oil pressure-operated valves in said latter branches normally closed to prevent leak through lower ducts of oil derived from the piping above said flexible sections.

10. In a chassis lubricating installation, in combination, a source of oil pressure, bearings upon the frame, bearings upon the axles, a conduit main supplied from said source, branches tapping said main to supply said frame bearings, branches to the bearings on the axles, each of said branches having a highly restricted duct, and oil pressure-operated valves in the axle branches and normally closed to prevent loss of oil through the lower ducts by draining from the piping at the upper ducts.

11. In a chassis lubricating installation, in combination, a pump structure, a conduit main supplied therefrom and extending lengthwise of the frame, taps from said main to supply the various bearings on said frame, taps from said main including flexible substantially air-tight portions to bridge to the bearings on the axles below said frame, said main being open throughout the length thereof, said taps having highly restricted open outlets to the corresponding bearings, and pressure-operated valves in the taps to the bearings at the axles to prevent draining from an open outlet and the associated piping on the frame to an outlet at a lower level.

12. In a chassis lubricating installation, in combination, a pump structure, a conduit supplied therefrom, said conduit having taps, each tap having a highly restricted open outlet for supplying an associated bearing at a level substantially different from that of said conduit, and a substantially air-tight valve in each tap near the junction with said conduit, said taps being substantially air-tight between the valves and the outlets thereof.

13. In a lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure generator, bearings at different levels, a system of conduits supplied from said generator and having outlet ducts to said bearings, a plurality of said outlets effecting connection to the corresponding bearings from the piping open both when the generator is discharging and when it is idle, normally closed valve means at the delivery port of said generator, and normally closed valves in the path of lubricant flow between the outlets at higher level and those at lower level to prevent escape of oil at the latter outlets by entry of air into the system at the former outlets; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

14. In a pressure-operated centralized chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, an oil-pressure generator, a system of piping supplied therefrom, bearings on the chassis frame and bearings below the chassis frame supplied from said piping, normally closed outlet means between said generator and said piping, said piping having highly restricted ducts corresponding one to each bearing and controlling the flow thereto, and pressure-operated valves, less in number than said bearings normally shutting off the otherwise vented connections through the piping extending between bearings at different levels; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

15. In a pressure-operated centralized chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a pressure-discharged pump, a system of piping supplied therefrom, bearings on the chassis frame and bearings below the chassis frame supplied from said piping, normally closed outlet means between said pump and said piping, said piping having highly restricted outlet ducts to the bearings, and pressure-operated valves, less in number than said bearings and in the piping which extends between open outlets at substantially different levels for normally interrupting flow therethrough; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

16. In a lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of lubricant, a substantially horizontal conduit supplied therefrom and having highly restricted open communication with the air, bearings at a level other than said conduit, a plurality of branch ducts supplied from said conduit, and leading to said bearings, and pressure-operated normally closed valves in said branch ducts; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

17. In a lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of lubricant, a substantially horizontal conduit supplied therefrom and normally in communication with the air, bearings at a level other than said conduit, a plurality of branch pipes supplied from said conduit, and having greatly restricted ducts near said bearings, and pressure-operated normally closed valves in said branch pipes; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

18. In a chassis lubricating installation, in combination, a source of oil pressure, a main conduit extending along the frame, bearings on the frame supplied from said main conduit, a branch conduit supplied from said main conduit and having a flexible section for bridging to the axle below the frame, said branch conduit having taps communicating with bearings at different levels, said taps having highly restricted outlets, a pressure-opened normally closed valve in the branch conduit between the taps therefrom and the main conduit, and further pressure-operated normally closed valve means in the path of flow from the upper through the lower of the bearings supplied from the branch conduit.

19. In a centralized chassis lubricating installation, in combination, a frame, bearings on the frame, axles, bearings on the axles, an oil pressure generator, a system of piping supplied from said generator and including branches open for the length thereof and having open outlet terminals connected to said bearings, the piping to the axles including air-tight flexible portions, each of said terminals having a plug to offer a minute highly resistant passage therethrough, preventing flow and permitting seepage under working pressures, and means normally closing the vented connections between terminals at substantially different levels.

20. Means for lubricating a bearing movable with respect to a source of lubricant pressure, including a conduit connecting said source to the bearing, said conduit having a flexible section to permit of the relative movement, and pressure-opened valves normally closed to isolate said flexible section with respect to the remainder of the conduit.

21. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, separate conduits supplied from said source and having branches open throughout the length thereof each supplying a corresponding bearing, each of said conduit branches having highly restricted ducts to prevent flow and permit seepage under working pressure and located at substantially a common level, said conduits communicating with each other only through their connection with said source, valve means normally closed to prevent said communication, and connections between said ducts and the bearings; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportion of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

22. In a lubricating installation, in combination, a single-cylinder oil pressure generator having a plurality of outlets, independent conduits connected to said outlets, one of said conduits having a plurality of taps for the bearings on the chassis frame, the other conduits each having taps with outlets supplying bearings located substantially at uniform and distinct levels, said generator having a piston provided with a flexible seating portion for sealing the intake ends of the various conduits when at the end of the discharge stroke.

23. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, bearings, a spring-discharged oil pump structure, fluid-tight piping provided with a plurality of inlets supplied from said structure, highly restricted ducts in said piping and in advance of said bearings, valve means in each of said inlets to control the connection between said pump structure and said piping, and manually operable means to effect pressure lubrication applied to the piping inlets from the pump; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

24. In a chassis lubricating installation, said chassis including a frame and a relatively movable element therebelow, in combination, a source of lubricant pressure on the frame, bearings on the frame, bearings on the element movable relative to the frame, piping connecting said source with said bearings, said piping including a flexible element in the portions bridging to the axles, to permit of the relative movement, said flexible portion comprising a relatively short length of flexible hose, and pressure-opened means isolating said flexible hose section with respect to the remainder of the piping.

25. An automobile chassis lubrication installation, said chassis having groups of bearings associated with different structural elements of said chassis including the chassis side frames, the front and rear axles, the tie rod and the drag link, said installation comprising a plurality of trunk and branch distribution systems with inlet valve means, single individual inlets and outlets to said bearings, said trunks extending along said structural elements and said branches extending from said trunks to said bearings, and said systems consisting in part of tubing along the outside of the elements to the bearings thereof to be lubricated and each system being provided with means at the ends thereof proportioning the lubricant among said bearings, the inlets of said systems being grouped together to be convenient for access, and a lubricant pump and reservoir unit with a single piston connected to the grouped inlets, said proportioning means dividing the discharge of said piston among said inlets and among said bearings, said valve means being automatically actuated upon actuation of said pump to permit lubricant to be fed into said inlets and automatically closed upon cessation of pump actuation, each of the inlets being independently connected to said pump and each taking the form of an inlet nipple, said nipples being arranged closely adjacent and parallel to each other, the valve means being carried by said piston and said piston discharging simultaneously into said nipples.

26. A pressure lubricating system comprising a plurality of conduits leading to a plurality of points to be lubricated, said conduits converging to form inlets which terminate adjacent each other, inlet valve means at the inlet end of each conduit opened to permit feed into the inlets of said conduits, a single piston unitary pump device, for delivering a measured quantity of lubricant to the conduits, each of said conduits being provided with proportioning means at the ends thereof to proportion the lubricant discharged by said piston among said inlets and among said points to be lubricated, manually operated means for charging said device, and spring operated means for discharging said device, each of the inlets being independently connected to said pump and each taking the form of an inlet nipple, said nipples being arranged closely adjacent and parallel to each other, said valve means being carried by the face of said piston adjacent said nipples and including a valve face which is pressed against said nipples to close the same when said piston has completed its discharge.

27. A pressure lubricating system comprising a plurality of conduits leading to a plurality of points to be lubricated, said conduits converging to form inlets which terminate adjacent each other, valve means at the inlet end of each conduit, and a pump device for delivering a measured quantity of lubricant to said conduits at each operation thereof, said pump device being provided with a single piston and said conduits being provided with means at the ends thereof for proportioning said measured quantity of lubricant among said conduits and among said points to be lubricated, said device being manually operable, each of the inlets being independently connected to said pump and each taking the form of an inlet nipple, said nipples being arranged closely adjacent and parallel to each other, the discharge of said pump being retarded by said proportioning means, said piston feeding all of said inlet nipples simultaneously and carrying said valve means.

28. A pressure lubricating system comprising a plurality of open conduits leading to a plurality of points to be lubricated, said conduits converging to form inlets which terminate adjacent each other, a pressure source including a single piston pump, inlet valve means opened to permit feed into said inlets and automatically closed by said piston at the inlet end of each conduit and flow obstructing means at the outlets of each conduit, each of the inlets being independently connected to said pump and each taking the form of an inlet nipple, said nipples being arranged closely adjacent and parallel to each other.

29. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, bearings at different levels, piping supplied from said source and having branches open throughout the length thereof, and provided with highly restricted open outlet ducts to the bearings, the piping to the different levels of bearings communicating only through their connection with said source, and valve means normally closed to prevent said communication; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

30. In a chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installations including, in combination, a group of bearings on the frame, a group of bearings below the frame at substantially uniform level, a pump structure, a plurality of independent conduits supplied from said pump structure, one of said conduits having a plurality of outlet ducts to the bearings of said first group, another of said conduits having a plurality of outlet ducts to the bearings of said second group, all of said conduits being open from end to end, and being highly restricted at each of the outlet ducts and being airtight from the pump structure to the outlet ducts, said pump structure having means associated with the operating element thereof to normally seal the pump end of each of said conduits; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominately effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

31. In a lubricating installation, in combination, a single cylinder oil pressure generator having a plurality of outlets, independent conduits connected to said outlets, one of said conduits having a plurality of taps for the bearings on the chassis frame, the other conduits each having taps with outlets supplying bearings located substantially at distinct levels, said generator having a piston provided with a flexible seating portion for sealing the intake ends of the various conduits when at the end of the discharge stroke.

32. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a single cylinder oil pressure generator, bearings at different levels, independent air-tight piping lines from the generator to the bearings at each of the levels, said piping including flexible conformations, said piping being open throughout the length thereof and having highly restricted open outlet ducts to the bearings, and valve means normally closed to prevent communication through the generator between the independent piping lines; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

33. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, separate conduits supplied from said source, each having branches open throughout the length thereof, each supplying a corresponding bearing, each of said conduits having highly restricted ducts located at substantially a common level, said conduits communicating with each other only through their connection with said source, and automatically operated valve means interrupting flow between said source and each of the independent conduits; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

34. In a centralized installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, bearings at different levels, independent piping from said source to the bearings at each of the levels, said piping having highly restricted open outlet ducts to the bearings, and automatically operated valve means interrupting flow between said source and each of the independent pipes; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

35. In a chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a group of bearings on the frame, a group of bearings below the frame at substantially uniform level, a pump structure, a plurality of independent conduits supplied from said pump structure, one of said conduits having a plurality of outlet ducts to the bearings of said first group, another of said conduits having a plurality of outlet ducts to the bearings of said second group, all of said conduits being open from end to end, and being highly restricted at each of the outlet ducts, and automatically operated valve fitting means connected between the pump structure and each of the conduits and normally closed; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

36. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, bearings, a piston-discharged oil pump structure, fluid-tight piping lines supplied from said structure, highly restricted ducts in said piping lines and in advance of said bearings, valve means at the inlets of each of said lines normally closed to interrupt connection between said pump structure and said piping, and said pump structure being manually operable to effect lubrication by pressure; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

37. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a piston-discharged oil pump structure, fluid-tight piping supplied from said structure and having sections open throughout the length thereof, each section provided with highly restricted open ducts at a common level, and fluid-tight from said structure to said ducts, bearings supplied from said ducts and valves in advance of the sections of the piping and normally closed to shut off the pump structure, and to close the otherwise vented connections between the piping sections, said pump structure being manually operable; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

38. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a spring-discharged oil pump structure, bearings at different levels, piping supplied from said structure and having branches open throughout the length thereof and provided with highly restricted open outlet ducts to the bearings, and valve means in advance of each of the branches of the piping to control the discharge of the pump structure, said pump structure being manually operated; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

39. In a centralized lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of oil pressure, pipe sections supplied from said source and having branches open throughout the length thereof, each branch supplying a corresponding bearing, said pipe sections communicating with each other only through their connection with said source, valve means normally closed to prevent said communication, said branches having highly restricted ducts, to prevent flow, but permit seepage under working pressure, the ducts of each pipe section located at substantially a common level, some of said ducts constituting terminals connected directly at corresponding bearings; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

40. In a chassis lubricating installation for supplying lubricant to and proportioning it among a plurality of distributed and spaced bearings to be lubricated, of the type having a central lubricant supply, a central lubricant pressure source and a plurality of substantially lubricant filled conduits with inlets in communication with said source and conducting lubricant to and transmitting lubricant pressure toward the bearings, said installation including, in combination, a source of lubricant pressure, a line of piping supplied from said source and connected to the bearings on the frame, a second line of piping supplied from said source and communicating with the bearings on the rear axle, and a third line similarly communicating with the bearings on the front axle, valves normally closed to prevent communication between said lines except through their connections with the source, said second and third lines including fluid-tight flexible portions to permit of the relative movement of frame and axle, and highly restricted ducts in the lines through which the lubricant pressure is transmitted, the ducts on each of said lines being substantially at a common level; said ducts each including a unitary compact flow proportioning high restriction element having an inlet from the conduits, an outlet toward the bearing and a restricting means, said elements affording a tremendously greater obstruction to the flow of lubricant toward the bearings than is afforded by the conduit and by the bearings, whereby said elements will predominantly effect the proportioning of lubricant among the bearings, will sustain a substantial back pressure in said conduits equivalent to the transmitted lubricant pressure during emission to the bearings and will only permit a slow seepage of the lubricant into the bearings throughout application of pressure from said pressure source.

41. A chassis lubricating installation for a plurality of spaced bearings on said chassis comprising a plurality of individual conduits leading to said bearings, said conduits converging and terminating adjacent each other, each conduit being provided with an inlet nipple and all said inlet nipples being positioned and spaced uniformly on a common plate and a lubricant compressor connected to said nipples and having a single piston displacing and feeding a measured quantity of lubricant to said conduit inlet nipples under pressure, the inlet nipples of said conduits being also provided with automatically operated inlet valve means, opened incidentally to actuation of the piston to permit lubricant to be fed into said conduits and closed upon the termination of said feeding, said piston feeding all of said inlet nipples simultaneously and carrying said inlet valve means.

42. A chassis lubricating installation for a plurality of spaced bearings on said chassis comprising a plurality of individual conduits leading to said bearings, said conduits converging and terminating adjacent each other, each conduit being provided with an inlet nipple and all said inlet nipples being positioned and spaced uniformly on a common plate and a lubricant compressor connected to said nipples and having a single piston displacing and feeding a measured quantity of lubricant to said conduit inlet nipples under pressure, said compressor being connected to all of said nipples simultaneously, and said installation being provided with means to proportion the lubricant among said bearings, the inlet nipples of said conduits being also provided with automatically operated inlet valve means, opened incidentally to actuation of the piston to permit lubricant to be fed into said conduits and closed upon the termination of said feeding, said means to proportion including metering fittings positioned at said bearings, said fittings offering a sufficiently high obstruction to lubricant flow as to retard lubricant displacement by said piston into said inlet nipples, said piston feeding all of said inlet nipples simultaneously and carrying said valve means.

JOSEPH BIJUR.